(12) United States Patent
Tsuda

(10) Patent No.: US 7,660,669 B2
(45) Date of Patent: Feb. 9, 2010

(54) LANE DEPARTURE AVOIDANCE SYSTEM

(75) Inventor: Hiroshi Tsuda, McLean, VA (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 400 days.

(21) Appl. No.: 11/692,670

(22) Filed: Mar. 28, 2007

(65) Prior Publication Data

US 2008/0243337 A1 Oct. 2, 2008

(51) Int. Cl.
*G08B 23/00* (2006.01)
*G08G 1/09* (2006.01)

(52) U.S. Cl. .................... 701/301; 701/41; 701/300; 340/436; 340/437

(58) Field of Classification Search ............ 701/41, 701/300, 301, 302; 340/436, 437
See application file for complete search history.

(56) References Cited

U.S. PATENT DOCUMENTS

| 2002/0095246 | A1 | 7/2002 | Kawazoe | |
|---|---|---|---|---|
| 2005/0212666 | A1* | 9/2005 | Kawazoe et al. | ............ 340/436 |
| 2005/0236210 | A1 | 10/2005 | Kawazoe et al. | |
| 2006/0224293 | A1 | 10/2006 | Kawazoe et al. | |
| 2006/0229840 | A1 | 10/2006 | Kawazoe et al. | |

* cited by examiner

*Primary Examiner*—Thomas G Black
*Assistant Examiner*—Peter D Nolan
(74) *Attorney, Agent, or Firm*—Global IP Counselors, LLP

(57) ABSTRACT

A lane departure avoidance system is provided with a rumble strip sensing device and a lateral lane departure rate determining component. The rumble strip sensing device is configured to detect an input from a rumble strip to a vehicle wheel that is indicative of a rumble strip engagement amount. The lateral lane departure rate determining component is configured to determine a lateral rate of lane departure of a vehicle based on a detection result of the rumble strip sensing device.

21 Claims, 4 Drawing Sheets

_US 7,660,669 B2_

LANE DEPARTURE AVOIDANCE SYSTEM

BACKGROUND OF THE INVENTION

1. Field of the Invention

The present invention generally relates to a lane departure avoidance system. More specifically, the present invention relates to a lane departure avoidance system that detects rumble strips in the road to determine if a vehicle is departing from a lane.

2. Background Information

Many of the traffic fatalities that occur are caused by a vehicle departing from its driving lane. Such lane departures include both a vehicle driving off a road or shoulder of the road, and a vehicle crossing lanes into an oncoming lane on an undivided road. Often inattentive driving and/or driving while drowsy tend to lead to such lane departures. In an effort to combat this, transportation authorities have begun to place rumble strips into roads. Rumble strips are bumps or indentations in the surface of a road such that when a vehicle's tire drives over a rumble strip, noise and/or vibration is generated to make the driver aware that he or she is driving off the road. Rumble strips of varying locations and varying patterns and shapes are used based on where the rumble strip is located in respect to the road. For example, a different type of rumble strip may be utilized to separate oncoming lanes as compared to the type of rumble strips that are used to line the sides of roads.

Recently, several proposals have been made to equipped vehicles with lane departure avoidance systems that provide a warning to the driver and/or perform an automatic countermeasure when the host vehicle may depart from a driving lane. Often, these lane departure avoidance systems rely on lane markers in determining if the host vehicle may depart from a driving lane. However, sometimes the lane markers can be difficult to detect by the host vehicle. Thus, the lane departure avoidance system may not be able to accurately determine a lane departure rate.

In view of the above, it will be apparent to those skilled in the art from this disclosure that there exists a need for an improved lane departure avoidance system. This invention addresses this need in the art as well as other needs, which will become apparent to those skilled in the art from this disclosure.

SUMMARY OF THE INVENTION

It has been discovered that in lane departure avoidance systems it is beneficial to use rumble strips to aid in the determination of a rate of lateral lane departure of a host vehicle is departing from its lane.

In accordance with one aspect of the present invention, a lane departure avoidance system is provided with a rumble strip sensing device and a lateral lane departure rate determining component. The rumble strip sensing device is configured to detect an input from a rumble strip to a vehicle wheel that is indicative of a rumble strip engagement amount. The lateral lane departure rate determining component is configured to determine a lateral rate of lane departure of a vehicle based on a detection result of the rumble strip sensing device.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
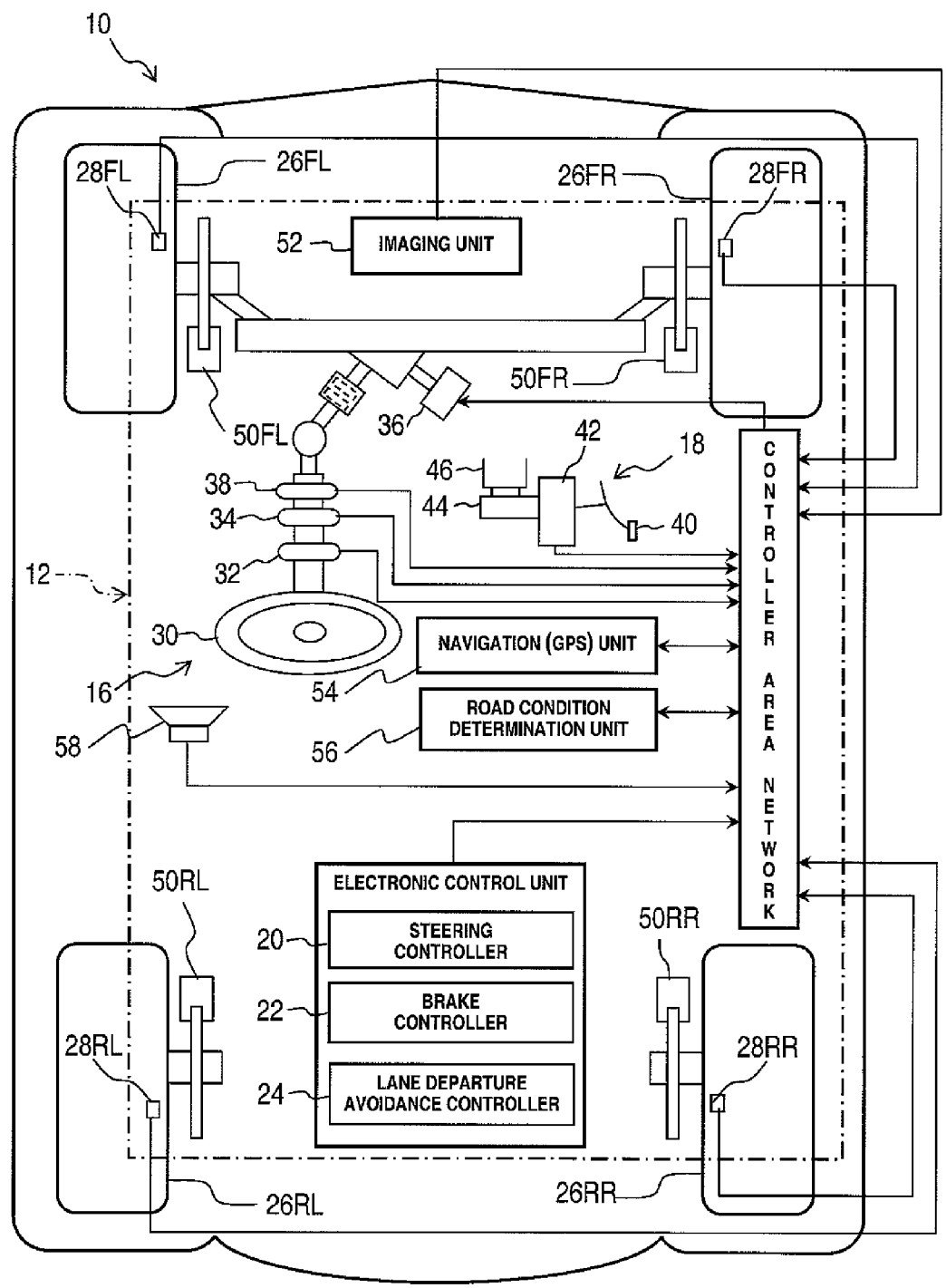
FIG. 1 is a schematic structural diagram of a host vehicle equipped with a lane departure avoidance apparatus in accordance with a one possible embodiment of the present invention.
Figure 2:
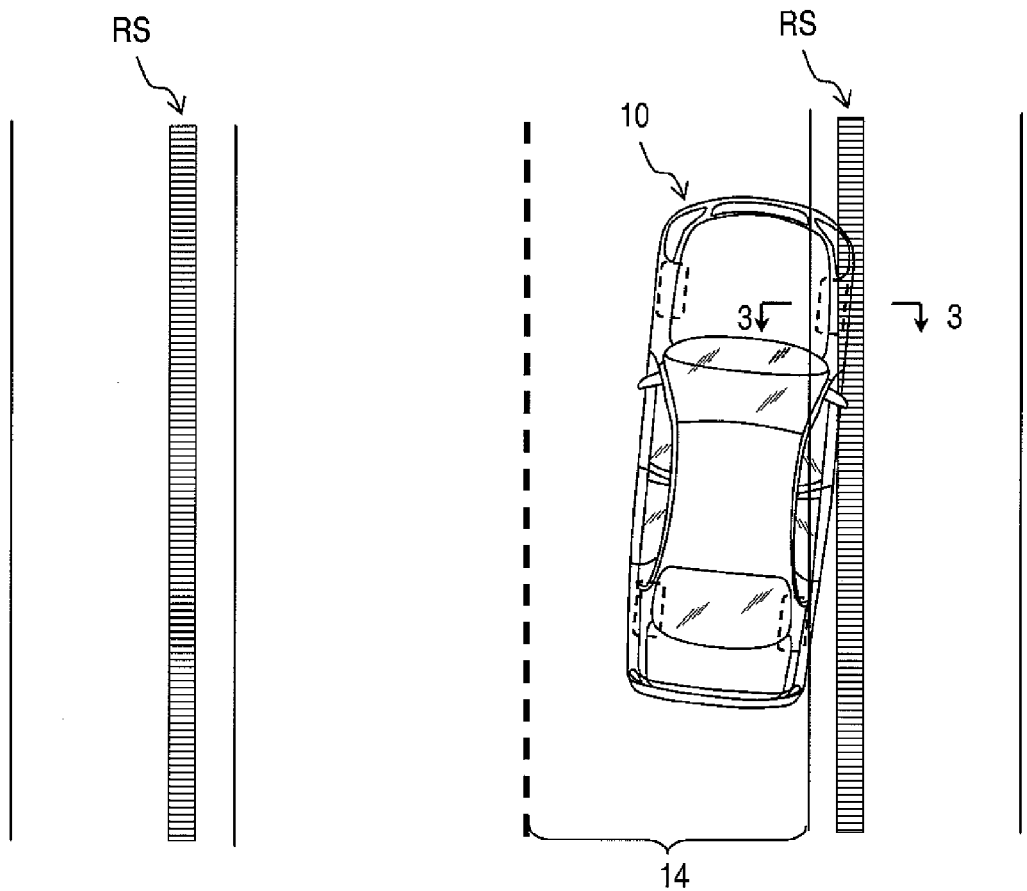
FIG. 2 is a schematic top plan (bird's eye) view of a road with rumble strips in the shoulders and a host vehicle beginning engagement with the right side rumble strip.
Figures 3, 4:
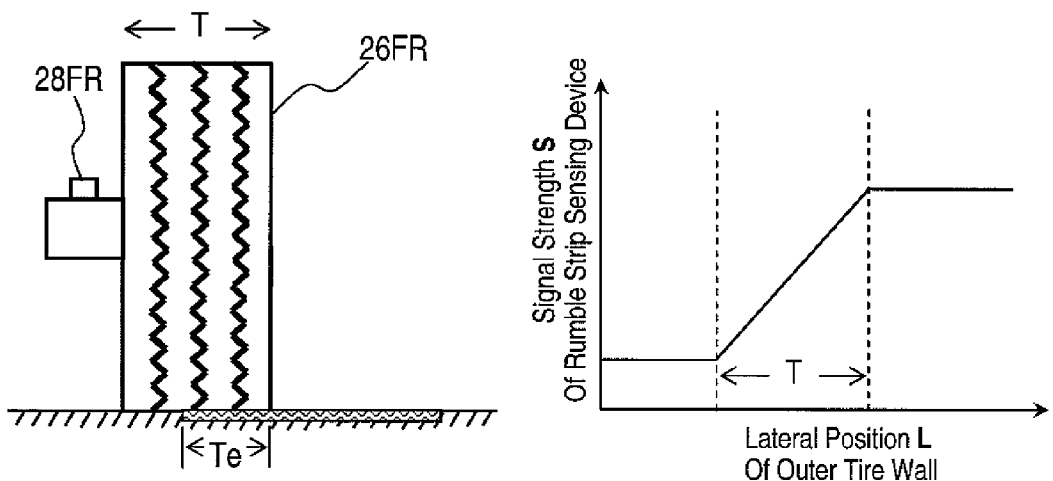
FIG. 3 is a simplified schematic cross sectional view of the road as seen along section line 3-3 in FIG. 2, with the front right side wheel of the host vehicle engaging the right side rumble strip.
FIG. 4 is a characteristics diagram or map showing the relationship between signal strength (S) of the rumble strip sensing device verses the lateral position L of the outer tire wall.

Referring initially to FIG. 1, a schematic diagram of a host vehicle 10 is illustrated that is equipped with a lane departure avoidance system 12 in accordance with one embodiment of the present invention. As seen in FIG. 2, a birds-eye view of the host vehicle 10 is illustrated that is engaging a rumble strip RS. FIG. 3 shows a schematic cross sectional view of the host vehicle's tire and the road as viewed along section line 3-3 of FIG. 2. As seen in FIG. 2, basically, the lane departure avoidance system 12 is configured to determine a lateral rate of lane departure of the host vehicle 10 from a driving lane 14 by detecting tire engagement with the rumble strip RS so that more appropriate countermeasures may be taken as explained below. In other words, the lane departure avoidance system 12 senses an input from a rumble strip RS to the vehicle 10 that is indicative of a rumble strip engagement amount. Next, the lane departure avoidance system 12 determines a lateral rate of lane departure of the host vehicle 10 based on a detection result. Also the lane departure avoidance system 12 is configured to determine an angle of engagement with the rumble strip RS. Depending upon the lateral rate of lane departure and the angle of engagement with the rumble strip RS that were determined, a lane departure countermeasure component of the lane departure avoidance system 12 activates a lane departure countermeasure based on the rumble strip engagement amount. The lane departure countermeasure component preferably includes an audible warning as the lane departure countermeasure when the rumble strip engagement amount is small and the lateral rate of lane departure is low. Alternatively or in conjunction with the audible warning, the lane departure countermeasure component preferably includes a haptic warning as the lane departure countermeasure when the rumble strip engagement amount is small and the lateral rate of lane departure is low. In addition to the audible and haptic warnings, the lane departure countermeasure component preferably includes at least one automatic vehicle corrective action as the lane departure countermeasure when the rumble strip engagement amount is large and the lateral rate of lane departure is high. For example, the lane departure countermeasure component preferably includes a braking corrective action and/or a steering corrective action as the lane departure countermeasure.

In the diagram of FIG. 1, the host vehicle 10 is basically equipped with a steering system 16, a braking system 18 and an electronic control unit ECU that includes a steering control controller 20 and a brake control controller 22. The steering system 16 and the braking system 18 act as lane departure countermeasure components of the lane departure avoidance system 12. A controller area network CAN is provided to operatively connect the steering system 16, the braking system 18, and the electronic control unit ECU to carry out the present invention. In the illustrated embodiment, the lane departure avoidance system 12 includes a lane departure avoidance controller 24 that is integrated into the electronic control unit ECU. Of course, it will be apparent to those skilled in the art from this disclosure that the controllers 20, 22 and 24 can be separate units as needed and/or desired. The lane departure avoidance controller 24 is operatively connected to a rumble strip sensing component that is configured to detect an input that is indicative of a rumble strip engagement amount from the rumble strip RS by the host vehicle 10. In the illustrated embodiment, the rumble strip sensing component includes a plurality of sensors with one being associated with each of the wheels 26FL, 26FR 26RL and 26RR.

Generally speaking, estimation of the lateral rate of lane departure of the host vehicle 10 with respect to the rumble strip RS occurs by the lane departure avoidance controller 24 receiving signals indicative of contact of a rumble strip with respective tires of the vehicle and estimating or otherwise determining a lateral rate of lane departure. One exemplary embodiment of the invention utilizes a rumble strip sensor associated with each tire of a four-tire vehicle: a front right rumble strip sensor, a front left rumble strip sensor, a rear right rumble strip sensor and a rear left rumble strip sensor. The lane departure avoidance controller 24 is configured to receive signals from each of these sensors. Based on which sensor is outputting a received signal, the lane departure avoidance controller 24 estimates a lateral rate of lane departure. For example, if the front right sensor outputs a signal to the processor indicative of contact of the front right tire with a rumble strip, and the vehicle is driving on a US road (right side driving), the lane departure avoidance controller 24 can estimate that the vehicle has traveled about a certain distance on or past the rumble strip at a detected lateral rate of lane departure. In the invention, only one of the wheels 26FL, 26FR 26RL and 26RR need to contact the rumble strip RS in order to determine a lateral rate of lane departure of the host vehicle 10.

Preferably, each of the wheels 26FL, 26FR, 26RL and 26RR has a rumble strip sensing device or sensor 28FL, 28FR, 28RL or 28RR, respectively, to detect tire engagement with the rumble strip RS. Thus, in the illustrated embodiment, the rumble strip sensing component includes a plurality of sensors with one near each of the wheels 26FL, 26FR, 26RL and 26RR, respectively. It is preferable that the rumble strip sensing devices 28FL, 28FR, 28RL or 28RR) are mounted to unsprung mass devices of the host vehicle 10 that are near each of the wheels 26FL, 26FR, 26RL and 26RR, respectively. In the illustrated embodiment, the rumble strip sensing devices 28FL, 28FR, 28RL and 28RR are mounted to the wheels 26FL, 26FR, 26RL and 26RR, respectively. Collectively, the rumble strip sensing devices 28FL, 28FR, 28RL and 28RR constitute a rumble strip sensing component that is configured to detect an input that is indicative of a rumble strip engagement amount from the rumble strip RS to one of the wheels 26FL, 26FR, 26RL and 26RR of the host vehicle 10. The lane departure avoidance controller 24 includes logic constituting a lateral lane departure rate determining component that is configured to determine a lateral rate of lane departure of the host vehicle 10 based on a detection result of the rumble strip sensing device (e.g., the rumble strip sensing devices 28FL, 28FR, 28RL and 28RR).

The rumble strip sensing devices 28FL, 28FR, 28RL and 28RR according to an embodiment of the present invention are adapted to sense input from the rumble strip RS into a tire of the host vehicle 10. In some embodiments of the present invention, the rumble strip sensing devices 28FL, 28FR, 28RL and 28RR are a self-contained units that include logic to determine whether a sensed input is input indicative of the rumble strip RS. In other embodiments, the sensing devices 28FL, 28FR, 28RL and 28RR simply transfers the sensed input from the rumble strips contact to the lane departure avoidance controller 24. That is, it converts the sensed input from the rumble strip RS into a signal that is sent to the lane departure avoidance controller 24 where the signal is analyzed to determine whether or not the signal generated by the sensing devices 28FL, 28FR, 28RL and 28RR is indicative of input from the rumble strip RS.

In one embodiment of the invention, the rumble strip sensing devices 28FL, 28FR, 28RL and 28RR of the rumble strip sensing device is configured to detect vibrations inputted from the rumble strip RS to one or more of the wheels 26FL, 26FR, 26RL and 26RR of the host vehicle 10. Alternatively, in another embodiment of the invention, the rumble strip sensing devices 28FL, 28FR, 28RL and 28RR of the rumble strip sensing device is configured to detect noise level inputted from the rumble strip RS to one or more of the wheels 26FL, 26FR, 26RL and 26RR of the host vehicle 10. Still in another embodiment of the invention, the rumble strip sensing devices 28FL, 28FR, 28RL and 28RR of the rumble strip sensing device is configured to detect wheel speed variations inputted from the rumble strip RS to one or more of the wheels 26FL, 26FR, 26RL and 26RR of the host vehicle 10. Examples of devices for the rumble strip sensing devices 28FL, 28FR, 28RL and 28RR include wheel mounted longitudinal accelerometers, wheel rotation sensors, etc. In other words, for example, sensing of the rumble strips RS can be done by longitudinal accelerometers placed near the wheels, or by monitoring the variations in wheel rotations by wheel rotation sensors, or by detecting an input that is can be used to determine a rumble strip engagement amount.

In the case of vibration sensors being used as the rumble strip sensing devices 28FL, 28FR, 28RL and 28RR, the vibration sensors can be in communication with a sprung mass and/or an unsprung mass. The vibration sensors can be adapted to determine the frequency of vibration of the sprung mass and/or the unsprung mass and output a signal indicative of the frequency of vibration of the sprung mass or the unsprung mass. That is, when the sprung mass or the unsprung mass vibrates as a result of input from the rumble strips into the tires of the vehicle, the vibration sensor can detect this vibration and convert the mechanical vibrational energy into an electronic signal that can be analyzed by, for example, the lane departure avoidance controller 24.

An example of the function of a vibration sensor according to the present invention will now be described. Input frequencies of rumble strips can be predetermined and stored onboard the vehicle for various vehicle speeds. For example, if the vehicle is driving at 55 miles per hour, the rumble strip input frequency might be 80 hertz. Thus, the vibration sensor would output a signal indicating that the sensor is sensing vibration at 80 hertz. The lane departure avoidance controller 24, receives this signal, and determines that the vibration sensor is sensing the vibration at 80 hertz. The lane departure avoidance controller 24 then compares this to the predetermined stored values of vibrations in for example, a lookup table or map, that are indicative of vehicle tire contact with a rumble strip for a given speed. For example, at 55 miles per hour, the processor may consider vibrations between 70 hertz and 90 hertz to be indicative of contact with a rumble strip, but if the processor receives a signal of only 65 hertz, the processor may consider this to not be indicative of contact with a rumble strip.

A vibration sensor according to the present embodiment can include a gravity sensor. In some embodiments of the invention, a gravity sensor can be a device that senses a vertical acceleration and/or an up-down acceleration. In some embodiments, it determines an acceleration (e.g., $m/s^2$, G, etc.) and outputs a voltage in proportion to the determined acceleration. In yet other embodiments, it may output a signal indicative of the determined acceleration. Still further, other embodiments of the invention can be practiced with a gravity sensor that simply converts a sensed acceleration to a proportional output voltage (e.g., there is no actual value determined for the acceleration). In some embodiments, and device, method or system that may be used to identify acceleration may be used to as a gravity sensor.

As mentioned above, the rumble strip sensor can also include a processor that is in communication with the vibration sensor and adapted to receive the signal from the vibration sensor. The processor can be of a configuration such that the processor can analyze this outputted signal from the vibration sensor and determine whether the frequency of vibration sensed by the vibration sensor is indicative of tire contact with the rumble strip. That is, the processor can analyze the signal and determine that the frequency of vibration is of a frequency that is indicative of tire contact with the rumble strip RS.

In the case of wheel rotational speed sensors being used as the rumble strip sensing devices 28FL, 28FR, 28RL and 28RR, the wheel rotational speed sensors can also be configured to output a signal indicative of the state of rotation of at least a portion of the wheel, which can include, for example, the tire portion and/or the hub of the wheel and/or an axle of the wheel. The lane departure avoidance controller 24 can receive this outputted signal and analyze the signal to determine whether a change of state of rotation of this portion of the wheel is indicative of contact of the tire with a rumble strip. The wheel rotational speed sensors, according to this embodiment, can be adapted to output a signal that is indicative of the rotation speed, the change in rotation speed, and/or a rate of change of rotation speed of the rotating portion of the wheel assembly, the lane departure avoidance controller 24 being adapted to analyze the signal and determine whether the outputted signal contains data indicative of tire contact with a rumble strip. By way of example and not by way of limitation, if the lane departure avoidance controller 24, after analyzing the signal, determines that the rotation speed of the rotating portion is increasing by 5 revolutions per second and then decreasing by 5 revolutions per second, the lane departure avoidance controller 24 may determine, based on the vehicle speed, that this change in rotation of the rotating portion of the wheel assembly is indicative of contact with rumble strips. By way of further example and not by way of limitation, a wheel rotational speed sensors can be used to determine that the vehicle is contacting a rumble strip. For example, the wheel rotational speed sensors can be composed of a rotor with projections, much like a gear, and a magnetic pickup. The sensor outputs pulses when the projections pass by the magnetic pickup. The lane departure avoidance controller 24 analyzes the pulses and determines a wheel rotational speed by a frequency of the pulse input. For example, at about 60 kph, the frequency may be about 400 Hz. When a tire contacts rumble strips, the tire may vibrate in the direction of the tire rotation. Consequently, a lower frequency of the pulse is added to the based frequency that indicates wheel rotation speed. For example, at about 60 kph, the frequency can be about 450 Hz. Thus, the change in the frequency of detection may be utilized to determine that the vehicle is contacting rumble strips.

In the case of noise sensors being used as the rumble strip sensing devices 28FL, 28FR, 28RL and 28RR, the noise sensors can detect contact with a road departure warning installation such as a rumble strip, installed on a road, with a tire of the vehicle by utilizing a microphone that is adapted to output a signal indicative of the sound sensed by the microphone. The microphone can be placed in a location on the vehicle where the sound generated by the rumble strip contacting the tire can be sensed and the microphone then outputs a signal indicative of this sensed sound. The microphone can be in communication with the lane departure avoidance controller 24, and the lane departure avoidance controller 24 can be adapted to receive the outputted signal from the microphone. The lane departure avoidance controller 24 can also be adapted to analyze the outputted signal from the microphone and determine whether the sound sensed by the microphone is indicative of a sound that is created by tire contact with a rumble strip based on the signal outputted from the microphone.

Regardless of the type of rumble strip sensing device, various data and/or information with respect to the vehicle and the particular rumble strip sensing devices are prestored in a storage device of the electronic control unit ECU. This prestored data and/or information include various tire data such as tire width T, and lateral departure rate maps for selected road conditions such as the one shown in FIG. 4. Since the signals from the rumble strip sensing devices or sensors 28FL, 28FR, 28RL and 28RR will vary depending on tire dimensions and the road conditions (e.g., road surface type such as asphalt or concrete and the rumble strip type such as continuous type or intermittent type), the lane departure avoidance controller 24 can preferable correct its determinations based on such road conditions. In particular, in order to determine the lateral rate of lane departure of the host vehicle 10, the lateral lane departure rate determining component of the lane departure avoidance controller 24 takes the strength of the rumble strip signals S and correlates them to the prestored data that has strength versus amount of rumble strip engagement such as the one shown in FIG. 4. For example, if the lateral rate of increase of engagement of the tires with the rumble strips (initial engagement amounts→¼→½ and so on) is known, then the lateral rate of departure can be determined based on the type of tire width T and the vehicle speed v. As seen in the graph of FIG. 4, the signal strength S from the rumble strip sensing devices or sensors 28FL, 28FR, 28RL and 28RR is plotted against the lateral position L of the outer wall of the tire. Thus, the signal strength S is correlated to the amount of tire engagement with the rumble strip RS and is dependent on vehicle speed. The lateral lane departure rate determining component of the lane departure avoidance controller 24 is further configured to determine a rumble strip engagement angle based on the detection result of the rumble strip sensing devices or sensors 28FL, 28FR, 28RL and 28RR.

By measuring the lateral rate of increase in the signal strength S, the lateral rate of lane departure can be derived. If the lateral rate of lane departure is low, then moderate countermeasures such as an audible warning or a haptic warning can be initiated. For faster lateral rates of lane departure, a steering torque can be applied to assist the driver in preventing the vehicle from departing from the lane. Alternatively, another example of a countermeasure is to apply a brake force to the wheels that are opposite to the direction of lane departure when the vehicle is departing from the lane.

Also an additional feature of the invention is to provide "black out time" after positive detection of rumble strips on one side of the host vehicle 10 so that (during the black out time) even if the tires on the other side picks up rumble strips an automatic active countermeasure (steering torque or braking torque) will not be performed. The reason being that the driver may have wanted to cross over the rumble strips to stop on the shoulder of the road, so the second engagement does not cause the system to steer to the right unnecessarily.

The steering system 16 is preferably a hydraulic operated steering with a steer-by-wire system in which the lane departure avoidance system 12 is operatively connected to apply a corrective steering torque. The steering system 16 preferably includes, among other things, a steering wheel 30, a torque sensor 32, a steering angle sensor 34 and a steering motor 36. The steering system 16 can be a relatively conventional steering system, and thus, the steering system 16 will not be discussed in detail herein. The steering system 16 preferably includes a turn signal switch 38 that is preferably operatively connected to the lane departure avoidance system 12 in order to deactivate an automatic vehicle corrective action that acts as a lane departure countermeasure.

The braking system 18 is preferably a brake-by-wire system in which the lane departure avoidance system 12 is operatively connected to apply a corrective braking force. The braking system 18 preferably includes, among other things, a brake pedal 40, a booster 42, a master cylinder 44 and a reservoir 46. The braking system 18 can be a relatively conventional braking system, and thus, the braking system 18 will not be discussed in detail herein. In the illustrated embodiment, the braking system 18 is a hydraulically operated braking system that includes a pair of front wheel cylinders 50FL and 50FR and a pair of rear wheel cylinders 50RL and 50RR. The braking system 18 allows independent control of a braking force at the front and rear wheels and the left and right wheels.

The lane departure avoidance controller 24 issues vehicle control commands to the lane departure countermeasure components (the steering system 16 and/or the braking system 18) after a determination has been made that the vehicle is deviating from a lane or beginning to deviate from a driving lane, based on the determination of contact with the rumble strip RS. As mentioned above, one type of vehicle control includes vehicle yaw control or lateral control systems utilizing steer by wire system. Vehicle yaw control or lateral control may also be obtained by issuing commands to an electric powered and/or a hydraulic powered steering unit. Vehicle yaw control or lateral control may be accomplished by utilizing brake controls, such as a brake by wire system, a brake actuator of an antilock brake system, dynamic control systems, automatic cruise control, engine control and/or an automatic transmission control. Still further, a passive safety system may be implemented when it has been determined that the vehicle is coming into contact with rumble strips and is deviating into an oncoming lane. The present invention can be practiced with any device that alerts and/or informs the driver that the vehicle is contacting rumble strips. This can include an auditory warning device 58, such as a buzzer, audio speaker, etc., a visual warning, such as an indicator and/or a blinking light, a tactile warning, an emitted fragrance or odor, the opening and/or closing of windows when a particular side of the vehicle or all of the windows of the vehicle, a tightening of seatbelts and/or the locking of doors. The alert can also result in the preparation of the vehicle for the possibility of a crash since contact with rumble strips tends to occur prior to a vehicle running off the road or into an oncoming lane when the road that the vehicle is traveling on is furnished with rumble strips.

In view of this, it is also noted that the present invention includes control of the vehicle and/or a warning issuance to a driver based on the lateral rate of departure as well as the lateral distance that the vehicle has traveled with respect to the rumble strip RS. That is, a control unit can be used to automatically steer the vehicle back onto the road. A warning device as described above can also be activated.

The control controllers 20 and 22 are preferably microcomputers that can be a single unit or separate units. In other words, a single microcomputer can be provided to perform all of the functions of the control controllers 20 and 22. Alternatively, one or more microcomputers can be provided to perform the functions of the control controllers 20 and 22. In any event, the control controllers 20 and 22 are provided with a lane departure prevention control program that at least activates a lane departure countermeasure based at least partially on a rumble strip engagement amount.

Preferably, the host vehicle 10 is provided with an imaging unit 52 that has a picture processing function and preferably includes a CCD (Charge Coupled Device) camera, for example, and a camera controller as object recognition sensors for detecting the position of the host vehicle 10 within a driving lane in order to evaluate the avoidance of driving lane departure by the host vehicle. Thus, the imaging unit 52 is designed to detect the position of the host vehicle in the driving lane in order to detect the lane departure tendency of the host vehicle. The imaging unit 52 is configured to pick up an image with a monocular (single-lens) camera composed of a CCD (Charge Coupled Device) camera, for example. The imaging unit 52 is preferably disposed on the front of the host vehicle 10.

The camera controller of the imaging unit 52 is preferably configured and arranged to detect white lines or other lane markers, for example, from the imaging picture of the area in front of the host vehicle 10. Thus, the driving lane is detected based on the detected lane markers. Furthermore, the imaging unit 52 calculates the angle (yaw angle) formed by the driving lane of the host vehicle and the longitudinal axis of the host vehicle, the lateral displacement from the center of the driving lane, the driving lane curvature, the lane width, and so forth. The imaging unit 52 outputs the calculated yaw angle, the calculated lateral displacement, the calculated driving lane curvature, the lane width, and the like to the electronic control unit ECU.

Preferably, the host vehicle 10 is provided with a navigation unit 54 that is configured and arranged to output road information to the electronic control unit ECU. Preferably, the road information (i.e., host vehicle driving environment)

includes information about the type of the road, such as the number of lanes and whether the road is an ordinary road or an expressway.

Preferably, the host vehicle 10 is provided with a road condition determination unit 56 that is configured and arranged to determinate a road condition based on various inputs from vehicle sensors (not shown) and/or the navigation unit 54. The road condition determination unit 56 correlates the signals from the rumble strip sensing devices or sensors 28FL, 28FR, 28RL and 28RR with the road conditions (e.g., road surface type such as asphalt or concrete and the rumble strip type such as continuous type or intermittent type) such that the lane departure avoidance controller 24 can correctly analysis the signals from the rumble strip sensing devices 28FL, 28FR, 28RL and 28RR.

Figure 6:
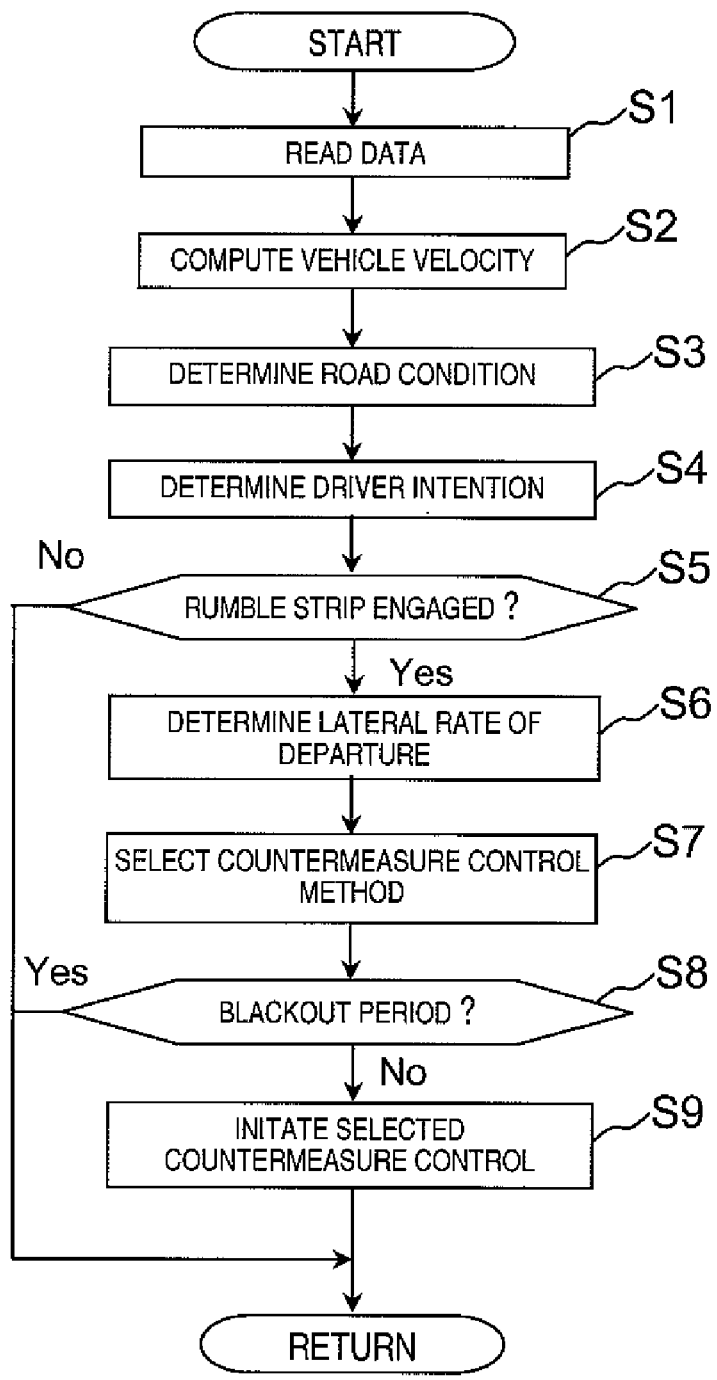
FIG. 6 is a flowchart illustrating the lane departure avoidance control processing executed by the controllers in accordance the illustrated embodiment of the present invention.

Referring to FIG. 6, a computational processing procedure performed by the lane departure avoidance controller 24 for avoiding lane departure will now be described below. The flow chart shown in FIG. 6 provides a flow chart for an algorithm for vehicle control based on the lateral displacement of the host vehicle 10 with respect to rumble strips RS. This computational processing is executed by using a timer interrupt at each specific predetermined sampling time interval $\Delta T$, such as every 10 msec for example. Communication processing is not included in the processing shown in FIG. 6, but the information obtained by computational processing is updated and stored in random access memory, and required information is read out from the random access memory when required.

First, in step S1, various kinds of data are read from the above-described sensors, by the lane departure avoidance controller 24. More specifically, the following types of data are read: the signal strengths from the rumble strip sensing devices 28FL, 28FR, 28RL and 28RR, the road information obtained by the navigation unit 54; the wheel velocity; the steering angle; the accelerator depression amount or throttle opening aperture size; the master cylinder hydraulic pressures; the turn switch signal from the turn signal switch 38; the signal for a hazard switch; the drive torque; and the yaw angle, the lateral displacement and the driving lane curvature from the imaging unit 52.

Next, the processing moves to step S2 where, the host vehicle velocity V is calculated based on the average value of the wheel velocities of the non-driven wheels. In the illustrated embodiment, the host vehicle is driven by the rear wheels, so the host vehicle velocity V is calculated based on the velocities VWFL and VWFR of the front left and right wheels 26FL and 26FR. In any case, the host vehicle velocity V is calculated using one of the Equations (1) as shown below, based on the wheel velocity Vwi of the non-driven wheels that was read in the above-described step S1.

$V=(Vwrl+Vwrr)/2$ for front wheel drive, and $V=(Vwfl+Vwfr)/2$ for rear wheel drive (1)

In Equation (1), the terms Vwfl and Vwfr are the respective wheel velocities of the left and right front wheels, and the terms Vwrl and Vwrr are the respective wheel velocities of the left and right rear wheels. In other words, in Equation (1), the host vehicle velocity V is calculated as the average value of the wheel speed of the driven wheels. In the present embodiment, the host vehicle is driven by the rear wheels, so the host vehicle velocity is calculated from the latter equation, i.e., based on the wheel velocity of the front wheels 26FL and 26FR.

Also, the host vehicle velocity V calculated in this manner is preferably used during normal driving. In other words, when the ABS (Anti-lock Brake System) control or the like is operating, for example, the estimated car body velocity that is estimated in the ABS control is used as the above-described vehicle velocity V. The value being used for the navigation information in the navigation unit 54 can also be used as the above-described vehicle velocity V.

In step S3, an evaluation of the driving environment is performed by the lane departure avoidance controller 24. Then the lane departure avoidance controller 24 proceeds to step S4.

In step S4, a determination of a driver's intention is performed by the lane departure avoidance controller 24 to determine if the driver intends to depart from the road. In other words, the intention of the driver to change lanes is determined. More specifically, the intention of the driver to change lanes can be determined, for example, based on the steering angle and/or the turn switch signal obtained in step S1. If the steering angle is greater than a prescribed amount, then it is assumed that the driver intends to turn or move onto the shoulder. Likewise, if the turn switch signal has been turned "on", then it is assumed that the driver intends to turn or move onto the shoulder. Then the lane departure avoidance controller 24 proceeds to step S5.

In step S5, the lane departure avoidance controller 24 evaluates the signals from the rumble strip sensing devices 28FL, 28FR, 28RL and 28RR to determine if any of the tires of the host vehicle 10 are engaging the rumble strip RS. If the tires of the host vehicle 10 are engaging the rumble strip RS, then the lane departure avoidance controller 24 proceeds to step S6. If the lane departure avoidance controller 24 determines that the vehicle 10 is not running over the rumble strip RS, then the lane departure avoidance controller 24 proceeds to the end of the process.

In step S6, a determination of the lateral rate of departure is performed by the lane departure avoidance controller 24 based on the signals from the rumble strip sensing devices 28FL, 28FR, 28RL and 28RR. Then the lane departure avoidance controller 24 proceeds to step S7.

Figure 5:
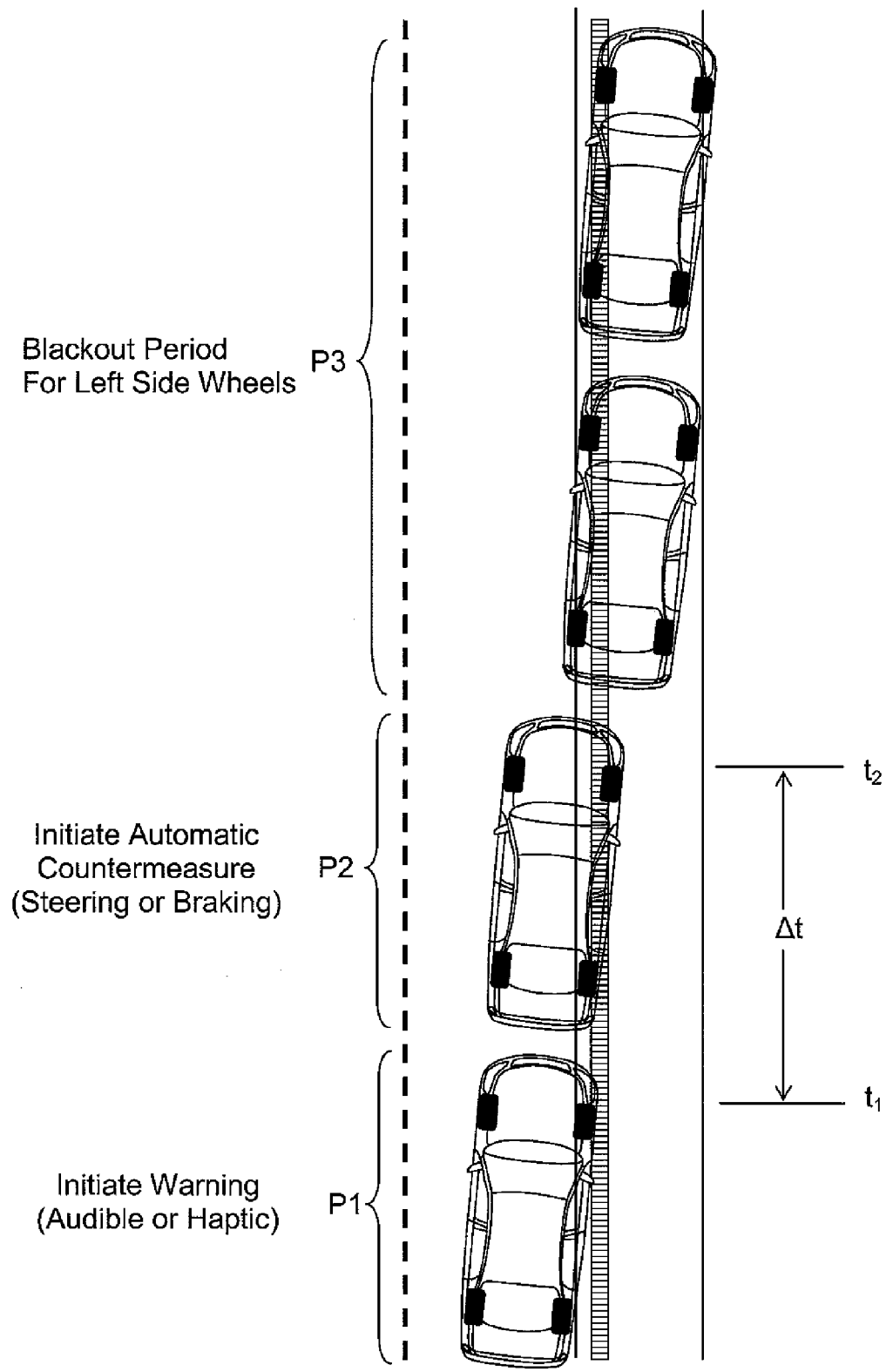
FIG. 5 is a schematic top plan (bird's eye) view of a road with rumble strips in the shoulders depicting a host vehicle departing its driving lane and crossing over the right side rumble strip.

The determination of the lateral rate of lane departure with respect to the rumble strip RS is schematically illustrated in FIG. 5. FIG. 5a shows a vehicle at moving from a first position P1 in which the vehicle's front right tire comes into contact with the rumble strip RS at time t1 to a second position P2 in which the vehicle's front right tire moves into further engagement of the rumble strip RS at time t2. The difference between times t1 and t2 is equal to a time period $\Delta t$ in which the host vehicle has traveled from the two positions P1 and P2. In other words, the time period $\Delta t$ between when the first signal is received by the processor and when the second signal is received is $\Delta t$. The rumble strip sensing device 28FR associated with the front right tire outputs signals indicative of contact with a rumble strip at times t1 and t2. The lateral displacement rate Dv can be determined by dividing the tread engagement amount Te (see FIG. 3) by the time period $\Delta t$, as shown below:

$Dv=Te/\Delta t$ (2)

where,

Te=tread engagement amount, and $\Delta t$=time between receiving the first signal and receiving the second signal.

The tread engagement amount Te is determined by the strength of the signal as seen in FIG. 4. In one embodiment of the invention, the lane departure avoidance controller 24 is configured to calculate Dv. However, in other embodiments of the invention, a lookup table or map for various tread engagement amounts Te and time periods $\Delta t$ can be used to determine the lateral rate of lane departure of the vehicle. It is noted that the term "based on," when used herein, is used broadly. That is, for example, any method or device that estimates/determines Dv utilizing information relating to Te and Δt, such as utilizing a lookup table, is still a determination of Dv based on Td and Δt, just as any device or method that estimates/determines Dv utilizing information relating to equation (2) above is still determination of Dv based on equation (2). Still further, any means, device or method to determine Dv may be used to practice the present invention.

The lane departure avoidance controller 24 is configured to estimate the heading of a vehicle (angle) with respect to the rumble strip RS. The lane departure avoidance controller 24 according to this embodiment receives a first signal and a second signal indicative of the tread engagement amount of the rumble strip RS as just described. However, the lane departure avoidance controller 24 is also adapted to estimate or otherwise determine an angle at which the vehicle is traveling with respect to the rumble strips based on the time period Δt between when the first signal was received by the processor and when the second signal was received by the processor, along with using the tire width T and the vehicle speed v.

In essence, the lane departure avoidance controller 24 utilizes the same information as described above, plus the tire width T and the longitudinal vehicle speed v, to determine the vehicle's heading with respect to the rumble strip RS. Basically, the direction of heading (departure angle θ) with respect to the rumble strip RS is determined based on the opposite leg and adjacent leg of a right triangle. The opposite leg of the right triangle is the tread engagement amount Te, while the adjacent side of the right triangle is the distance that the vehicle travels from t1 to t2, which may then be used to determine the departure angle θ. In an alternative embodiment of the invention, the processor receives input regarding the longitudinal distance that the vehicle has traveled between t1 and t2 in combination with Td, to determine the angle of deviation from the rumble strips. Equations for calculating θ are seen below:

$$\tan \theta = Te/(v * \Delta t) \quad (3)$$

where,

Te=tread engagement amount, v=longitudinal speed of the vehicle, and

Δt=time between receiving the first signal and receiving the second signal.

In step S7, a countermeasure is selected based on the determination of the lateral rate of departure is performed by the lane departure avoidance controller 24 in accordance with the signals from the rumble strip sensing devices 28FL, 28FR, 28RL and 28RR. Then the lane departure avoidance controller 24 proceeds to step S8.

In step S8, the lane departure avoidance controller 24 determines if a black out period applies to the selected countermeasure. In other words, the lane departure countermeasure component of the lane departure avoidance controller 24 prohibits the vehicle corrective action for a prescribed blackout time after positive detection of rumble strips on one side of the host vehicle so that (during the black out time) even if the tires on the other side detect the rumble strip RS an automatic active countermeasure (steering torque or braking torque) will not be performed (see position P3 in FIG. 5). The reason being that the driver may have wanted to cross over the rumble strip RS to stop on the shoulder of the road, so the second engagement does not cause the system to steer to the right unnecessarily.

Thus, the lane departure avoidance controller 24 evaluates the signals from the rumble strip sensing devices 28FL, 28FR, 28RL and 28RR to determine if a prescribed blackout period applies. If the blackout period does not apply, then the lane departure avoidance controller 24 proceeds to step S9. If the lane departure avoidance controller 24 determines that the blackout period applies, then the lane departure avoidance controller 24 proceeds to the end of the process.

In step S9, the lane departure avoidance controller 24 initiates the appropriate countermeasure that was selected based on the determination of the lateral rate of departure. Various lane departure avoidance systems have been proposed with automatic countermeasures for warning and/or correcting a vehicle during lane departure. Anyone of these lane departure avoidance systems can be employed with this system to initiates the appropriate countermeasure. Then the lane departure avoidance controller 24 proceeds to the end of the process.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. It is further noted that when referring to "logic" herein, "logic" is used broadly. For example, logic includes hardware, software, firmware, etc. Simple and/or complex circuits can be utilized to implement logic according to the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time.

Many of the above devices and/or methods may utilize piezoelectric devices to determine the state of various components described herein. For example, a piezoelectric device may be utilized to determine the state of pressure in a shock absorber.

It is further noted that when referring to devices such as processors and sensors, such devices are referred to both as a single unit and as separate units. That is, a processor that receives a signal from a sensor could include a sensor, and visa versa.

The present invention also includes software and firmware for implementing the above and below described embodiments of the invention. In this regard, algorithms according to the present invention will now be described; algorithms which can form the basis for control programs and routines for implementing aspects of the invention.

Accordingly, the present invention includes a program product and hardware for implementing the above algorithms, as well as the systems and methods described herein, and also for the control of the devices described herein.

Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lane departure avoidance system comprising:
    a rumble strip sensing component configured to detect an input signal having a signal strength from a rumble strip to a vehicle wheel that is indicative of a rumble strip engagement amount;
    a lateral lane departure rate determining component configured to determine a lateral rate of lane departure of a vehicle based on a detection result of the rumble strip sensing device, with the lateral rate of lane departure being determined based on a change in the signal strength of the input signal over a prescribed period of time.

2. The lane departure avoidance system according to claim 1, wherein
    the rumble strip sensing component is configured to detect at least one of vibrations inputted from the rumble strip to the vehicle wheel, noise level of the vibrations inputted from the rumble strip to the vehicle wheel, and wheel speed variations inputted from the rumble strip to the vehicle wheel.

3. The lane departure avoidance system according to claim 1, wherein
    the rumble strip sensing component includes at least one of a wheel mounted longitudinal accelerometer and a wheel rotation sensor.

4. The lane departure avoidance system according to claim 1, wherein
    the lateral lane departure rate determining component is further configured to determine a rumble strip engagement angle based on the detection result of the rumble strip sensing component.

5. The lane departure avoidance system according to claim 4, wherein
    the rumble strip engagement angle is based on the rumble strip engagement amount and a vehicle speed of a vehicle having the vehicle wheel.

6. The lane departure avoidance system according to claim 1, wherein
    the rumble strip sensing component includes a plurality of sensors.

7. A vehicle equipped with the lane departure avoidance system according to claim 1, wherein
    the rumble strip sensing component is mounted to an unsprung mass.

8. The lane departure avoidance system according to claim 1, further comprising
    a lane departure countermeasure component configured to activate a lane departure countermeasure based on the rumble strip engagement amount.

9. The lane departure avoidance system according to claim 8, wherein
    the lane departure countermeasure component includes at least one of an audible warning, a haptic warning, a vehicle corrective action, a braking action, and a steering action as the lane departure countermeasure.

10. The lane departure avoidance system according to claim 9, wherein
    the lane departure countermeasure component is configured to prohibit the vehicle corrective action for a prescribed blackout time.

11. The lane departure avoidance system according to claim 1, wherein
    the change in the signal strength is calculated based on the difference between a first measurement of the signal strength when the prescribed period of time begins and a second measurement of the signal strength when the prescribed period of time ends.

12. The lane departure avoidance system according to claim 1, wherein
    the signal strength is proportional to the rumble strip engagement amount.

13. The lane departure avoidance system according to claim 1, wherein
    the rumble strip sensing component detects the input when at least a portion of the vehicle wheel engages the rumble strip; and
    the rumble strip engagement amount is based on a size of the portion of the vehicle wheel.

14. The lane departure avoidance system according to claim 13, wherein
    the signal strength is proportional to the rumble strip engagement amount.

15. The lane departure avoidance system according to claim 13, wherein
    the signal strength increases as the rumble strip engagement amount increases.

16. The lane departure avoidance system according to claim 15, wherein
    the signal strength is low when the portion of the vehicle wheel is small in size, the signal strength is high when the portion is large in size, and the signal strength is between low and high when the portion is between small and large in size.

17. A vehicle equipped with the lane departure avoidance system according to claim 1, wherein
    the rumble strip sensing component includes a plurality of sensors with one of the sensors mounted near each of a plurality of vehicle wheels, the vehicle wheels including the vehicle wheel receiving the input from the rumble strip.

18. The lane departure avoidance system according to claim 17, wherein the lateral rate of lane departure is determined based on each of the sensors independently.

19. The lane departure avoidance system according to claim 1, wherein the vehicle wheel defines a tire width;

the rumble strip sensing component detects the input when at least a portion of the vehicle wheel engages the rumble strip; and the rumble strip engagement amount is based on an amount of the tire width defined by the portion of the vehicle wheel.

20. A lane departure avoidance system comprising:

a rumble strip sensing component configured to detect an input from a rumble strip to a vehicle wheel that is indicative of a rumble strip engagement amount that corresponds to a width dimension of engagement of at least a portion of the vehicle wheel that engages the rumble strip based on at least one of vibrations inputted from the rumble strip to the vehicle wheel, noise level of the vibrations inputted from the rumble strip to the vehicle wheel, and wheel speed variations inputted from the rumble strip to the vehicle wheel; and a lateral lane departure rate determining component configured to determine a lateral rate of lane departure of a vehicle based on a detection result of the rumble strip sensing device.

21. A lane departure avoidance system comprising:

a rumble strip sensing component configured to detect an input from a rumble strip to a vehicle wheel that is indicative of a rumble strip engagement amount that corresponds to a width dimension of engagement of at least a portion of the vehicle wheel that engages the rumble strip;

a lateral lane departure rate determining component configured to determine a lateral rate of lane departure of a vehicle based on a detection result of the rumble strip sensing device; and a lane departure countermeasure component configured to activate a lane departure countermeasure based on the rumble strip engagement amount, the lane departure countermeasure component including at least one of an audible warning, a haptic warning, a vehicle corrective action, a braking action, and a steering action as the lane departure countermeasure.

* * * * *